United States Patent
Saito et al.

(10) Patent No.: US 8,004,570 B2
(45) Date of Patent: Aug. 23, 2011

(54) IMAGE PROCESSING APPARATUS, IMAGE-PICKUP APPARATUS, AND IMAGE PROCESSING METHOD

(75) Inventors: Mitsuhiro Saito, Utsunomiya (JP); Takahiro Oshino, Utsunomiya (JP); Hidetoshi Tsubaki, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 322 days.

(21) Appl. No.: 11/610,564

(22) Filed: Dec. 14, 2006

(65) Prior Publication Data

US 2007/0132856 A1 Jun. 14, 2007

(30) Foreign Application Priority Data

Dec. 14, 2005 (JP) ................. 2005-360108

(51) Int. Cl.
*H04N 5/228* (2006.01)
*G03B 17/00* (2006.01)

(52) U.S. Cl. ........... 348/208.5; 348/208.99; 348/208.12; 396/52

(58) Field of Classification Search ............. 348/208.99–208.16; 396/52–55; 382/107; 359/554
See application file for complete search history.

(56) References Cited

U.S. PATENT DOCUMENTS

| 2003/0002746 A1* | 1/2003 | Kusaka ............. 382/255 |
| 2005/0052538 A1* | 3/2005 | Sato et al. ............. 348/208.1 |
| 2005/0185058 A1* | 8/2005 | Sablak ............. 348/208.99 |
| 2006/0215036 A1* | 9/2006 | Chung et al. ............. 348/208.4 |
| 2006/0256200 A1* | 11/2006 | Matei et al. ............. 348/208.14 |
| 2006/0284984 A1* | 12/2006 | Takemoto et al. ............. 348/208.99 |

FOREIGN PATENT DOCUMENTS

| JP | 2002-116476 | 4/2002 |
| JP | 2003-134385 A | 5/2003 |
| JP | 2004-227003 | 8/2004 |

\* cited by examiner

*Primary Examiner* — Nhan T Tran
*Assistant Examiner* — Richard Bemben
(74) *Attorney, Agent, or Firm* — Rossi, Kimms & McDowell LLP

(57) ABSTRACT

The present invention provides an image processing apparatus capable of obtaining good shake-corrected images in electronic image stabilization irrespective of changes of image-taking conditions. An image processing apparatus comprising: a shake correcting part that performs coordinate transformation processing based on shake information to an input image that is generated by use of an image-pickup device; and a method changing part that changes a coordinate transformation method for the coordinate transformation processing.

8 Claims, 19 Drawing Sheets

IMAGE PROCESSING APPARATUS, IMAGE-PICKUP APPARATUS, AND IMAGE PROCESSING METHOD

BACKGROUND OF THE INVENTION

The present invention relates to an image processing technique that obtains an output image with reduced shake by performing coordinate transformation processing as shake correction processing to an image captured by an image-pickup apparatus.

Shake correction methods provided in image-pickup apparatuses include optical image stabilization and electronic image stabilization. The electronic image stabilization selects as a take-out area a region to be actually output (e.g., recorded or displayed) from within one frame image that is generated by use of an image-pickup device, and moves the take-out area in accordance with amount of shake for each frame. Then, coordinate transformation processing is applied to each take-out area image to thereby output an image with reduced shake (or a shake-corrected image).

Shake of an image-pickup apparatus can be detected by using an angular velocity sensor or angular acceleration sensor, or by comparing input images for two successive frames to detect motion vectors on the images as shake.

Shake appearing on an image includes combinations of various types of shake such as translation and rotation. Besides, characteristics of apparent shake on an image vary depending on the amount of shake or image-taking conditions such as zooming position of an imaging optical system. Accordingly, a technique is desired that provides properly shake-corrected images irrespective of various situations of shake occurrence.

For example, Japanese Patent Laid-Open No. 2002-116476 proposes a shake correction technique that uses an angular velocity sensor for shake detection. With this technique, although shake in the direction of panning and/or tilting (panning/tilting shake) can be detected, translational shake cannot be detected. Thus, in normal image-taking, shake correction is performed on the assumption that translational shake can be approximated to shake in the direction of panning or tilting, but in close-up image-taking, shake correction itself is not performed because the approximation does not hold in close-up image-taking.

Japanese Patent Laid-Open No. 2004-227003 proposes a shake correction technique that allows selection of an image shake correction characteristic appropriate for various image-taking conditions (i.e., a mode in which cut-off frequency for shake correction is high and a mode in which the cut-off frequency is low) and/or the range of shake correction (i.e., a range in which correction optical devices can move).

However, although the technique proposed in Japanese Patent Laid-Open No. 2002-116476 can provide a properly shake-corrected image except in close-up image-taking, it cannot provide a shake-corrected image in close-up image-taking because it does not perform shake correction itself in close-up image-taking. The shake correction technique proposed in Japanese Patent Laid-Open No. 2004-227003 is mainly focused on optical image stabilization and is not applicable to electronic image stabilization.

BRIEF SUMMARY OF THE INVENTION

The present invention provides an image processing technique capable of obtaining good shake-corrected images in electronic image stabilization irrespective of changes of image-taking conditions.

An image processing apparatus of one aspect according to the present invention, comprising: a shake correcting part that performs coordinate transformation processing based on shake information to an input image that is generated by use of an image-pickup device; and a method changing part that changes a coordinate transformation method for the coordinate transformation processing.

The image-pickup apparatus that installed the image processing apparatus compose another aspect according to the present invention.

Further, an image processing apparatus of another aspect according to the present invention, comprising the steps of: obtaining shake information; performing coordinate transformation processing based on the shake information to an input image that is generated by use of an image-pickup device; and changing a coordinate transformation method for the coordinate transformation processing.

Other objects and further features of the present invention will become readily apparent from the following description of the preferred embodiments with reference to the accompanying drawings.

DETAILED DESCRIPTION OF THE PREFERRED EMBODIMENTS

Preferred embodiments of the present invention will be described below with reference to drawings.

Embodiment 1

Figure 1:
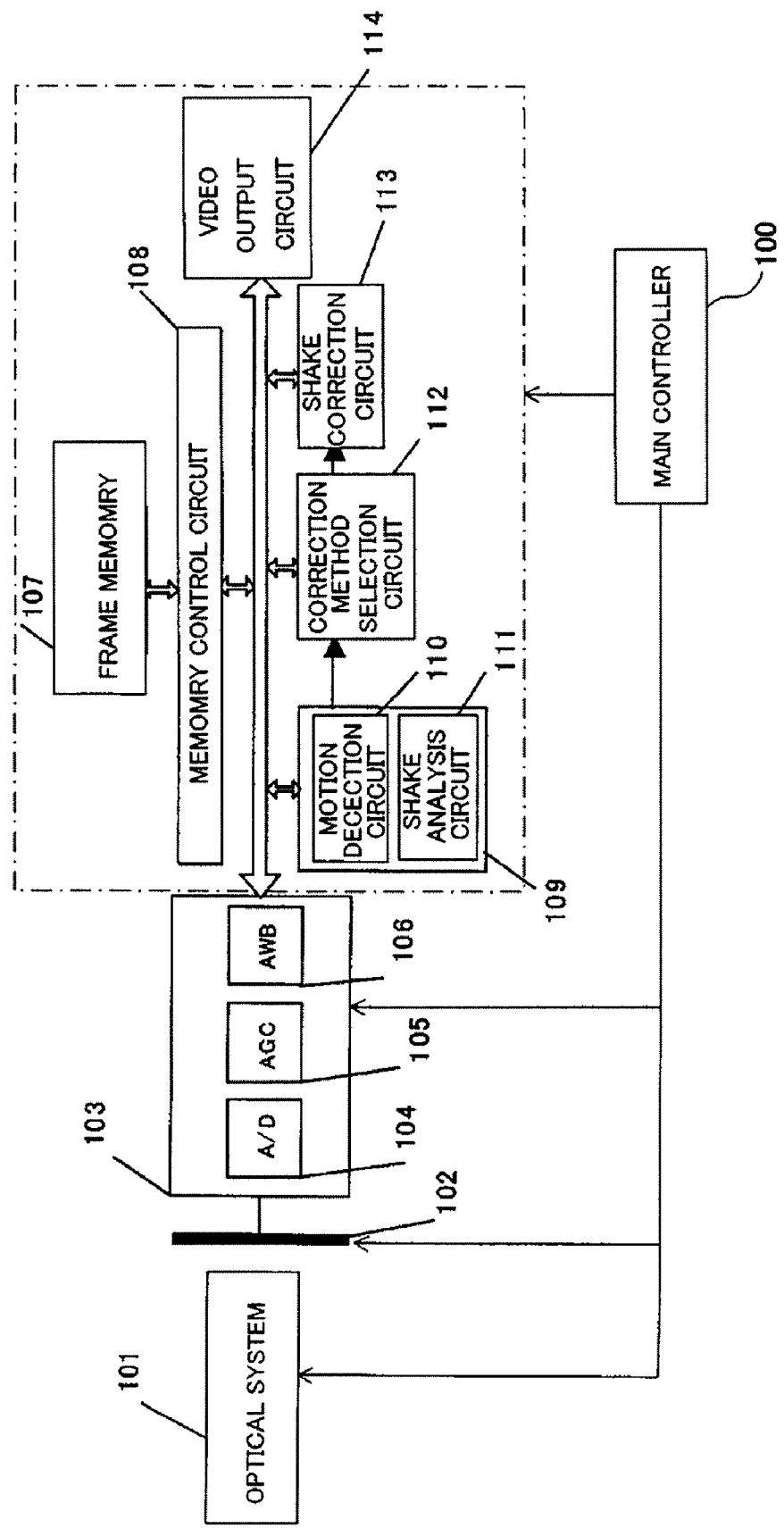
FIG. 1 shows the configuration of an image-pickup apparatus (image processing apparatus) as the first embodiment of the invention.

FIG. 1 shows the configuration of an image-pickup apparatus such as a video camera and a digital still camera that includes an image processing apparatus as the first embodiment of the present invention. In FIG. 1, reference numeral 101 denotes an optical system that forms subject images, and 102 denotes an image-pickup device such as a CCD sensor and a CMOS sensor that photoelectrically converts subject images formed by the optical system 101. Reference numeral 103 denotes an image forming circuit for generating a video signal from an electrical signal output by the image-pickup device 102.

The image forming circuit 103 includes an A/D conversion circuit 104, an automatic gain control circuit (AGC) 105, and an automatic white balancing circuit (AWB) 106, and generates a digital video signal. The A/D conversion circuit 104 converts an analog signal to a digital signal. The AGC 105 provides level correction of a digital signal. The AWB 106 provides white level correction of images.

Reference numeral 107 denotes frame memory for temporarily storing and holding one or more frames of a video signal generated by the image forming circuit 103. Reference numeral 108 denotes a memory control circuit for controlling video signals that are input to and output from the frame memory 107. Reference numeral 109 denotes a shake analysis part for detecting shake of the image-pickup apparatus from neighboring frame images and analyzing trend of the motion, including a motion detection circuit 110 and a shake analysis circuit 111.

Reference numeral 112 denotes a correction method selection circuit as method changing part, which selects a coordinate transformation method (hereinafter referred to as a "shake correction method") optimal as coordinate transformation processing to be applied to an input image based on amount of shake.

Reference numeral 113 denotes a shake correction circuit that performs shake correction by a shake correction method selected at the correction method selection circuit 112. Reference numeral 114 denotes a video output circuit, which serves as an output part that displays a shake-corrected image on a display not shown or records the image on a recording medium such as a semiconductor memory, optical disk, and magnetic tape.

Reference numeral 100 denotes a main controller for controlling operations of the image pickup device 102, image forming circuit 103, memory control circuit 108, shake analysis part 109, correction method selection circuit 112, shake correction circuit 113, and video output circuit 114. The main controller 100 may be a CPU and the like.

The operation of the image-pickup apparatus (image processing apparatus) thus configured will be described with respect to the flowchart shown in FIG. 2. The operation described here is carried out in accordance with a computer program (software) stored in memory not shown of the main controller 100. The same applies to other embodiments discussed below.

Figure 2:
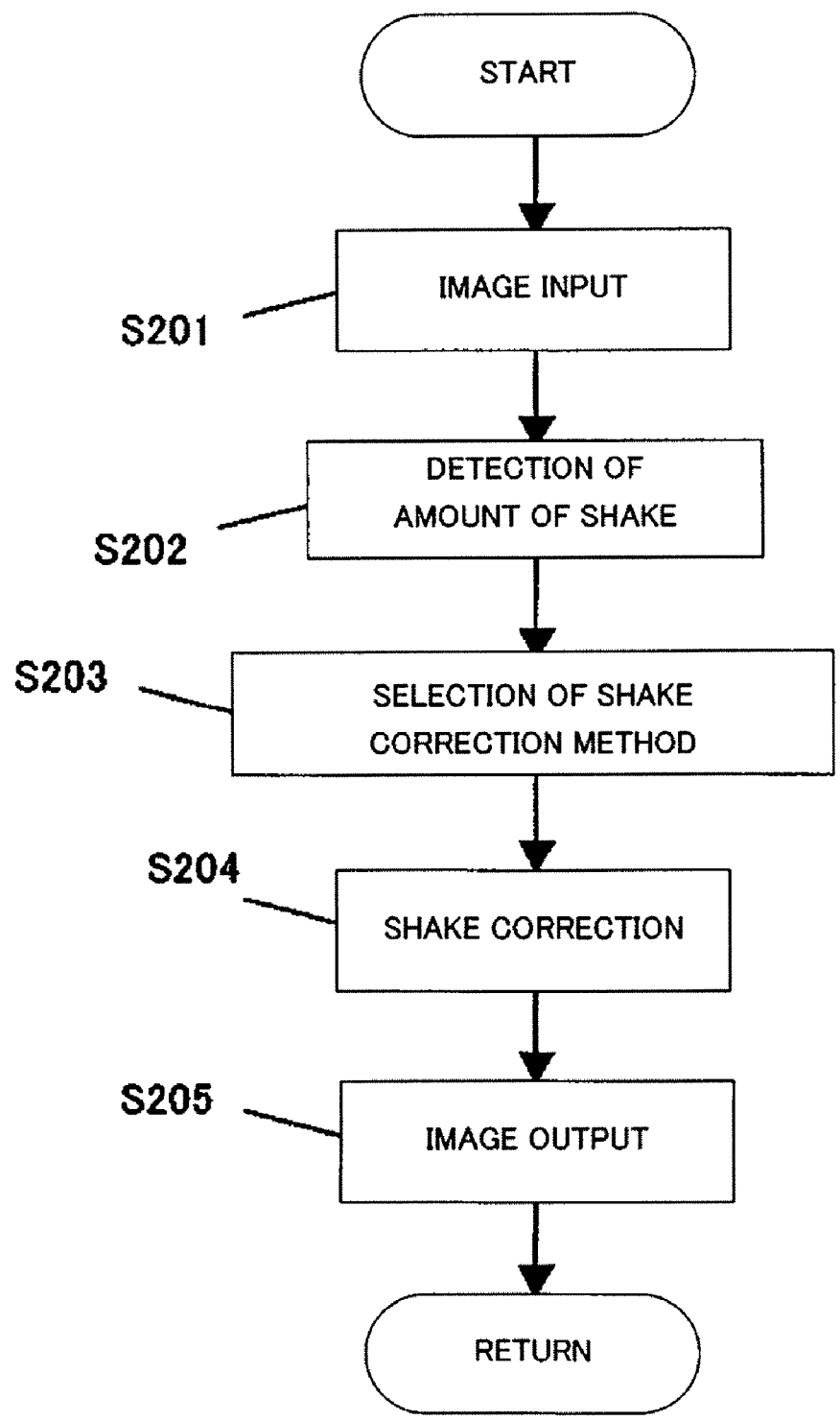
FIG. 2 is a flowchart illustrating shake correction processing in the first embodiment.

In FIG. 2, at step S201, a subject image formed by the optical system 101 is photoelectrically converted by the image pickup device 102. The image pickup device 102 outputs an analog signal corresponding to the brightness of the subject, which analog signal is input to the image forming circuit 103. In the image forming circuit 103, the A/D conversion circuit 104 converts the analog signal to a 14-bit digital signal, for example. After further being subjected to signal level correction and white level correction at the AGC 105 and AWB 106, the digital video signal (i.e., a frame image as an input image) is temporarily recorded and held in the frame memory 107.

In the image-pickup apparatus, frame images are generated in sequence at a predetermined frame rate and frame images stored and held in the frame memory 107 are input to the shake analysis part 109 sequentially. Frame images stored in the frame memory 107 are updated sequentially. These operations are controlled by the memory control circuit 108.

At step S202, shake information including amount and direction of shake is detected. Specifically, the motion detection circuit 110 detects motion vectors that indicate displacement of the subject image and its direction between successive frame images. Motion vectors can be detected using a general detection method such as template matching and gradient methods, although there is no limitation on the method. In addition, motion vectors are detected in a plurality of image areas. These motion vectors represent shake information that indicates the amount and direction of apparent shake of individual subjects appearing on an image.

Motion vectors in a plurality of image areas detected by the motion detection circuit 110 are integrated by the shake analysis circuit 111 to generate a representative motion vector that represents shake of the entire image.

Although this embodiment describes a case where amount of shake is detected by an image processing operation method that uses frame images as input images, a shake sensor such as an angular velocity sensor may be also employed for detection of shake amount.

At step S203, shake occurring on the image which is currently being taken is analyzed using amount of shake, which is contained in the shake information provided by the shake analysis part 109, and a shake correction method optimal for correcting the shake is selected.

Figure 3:
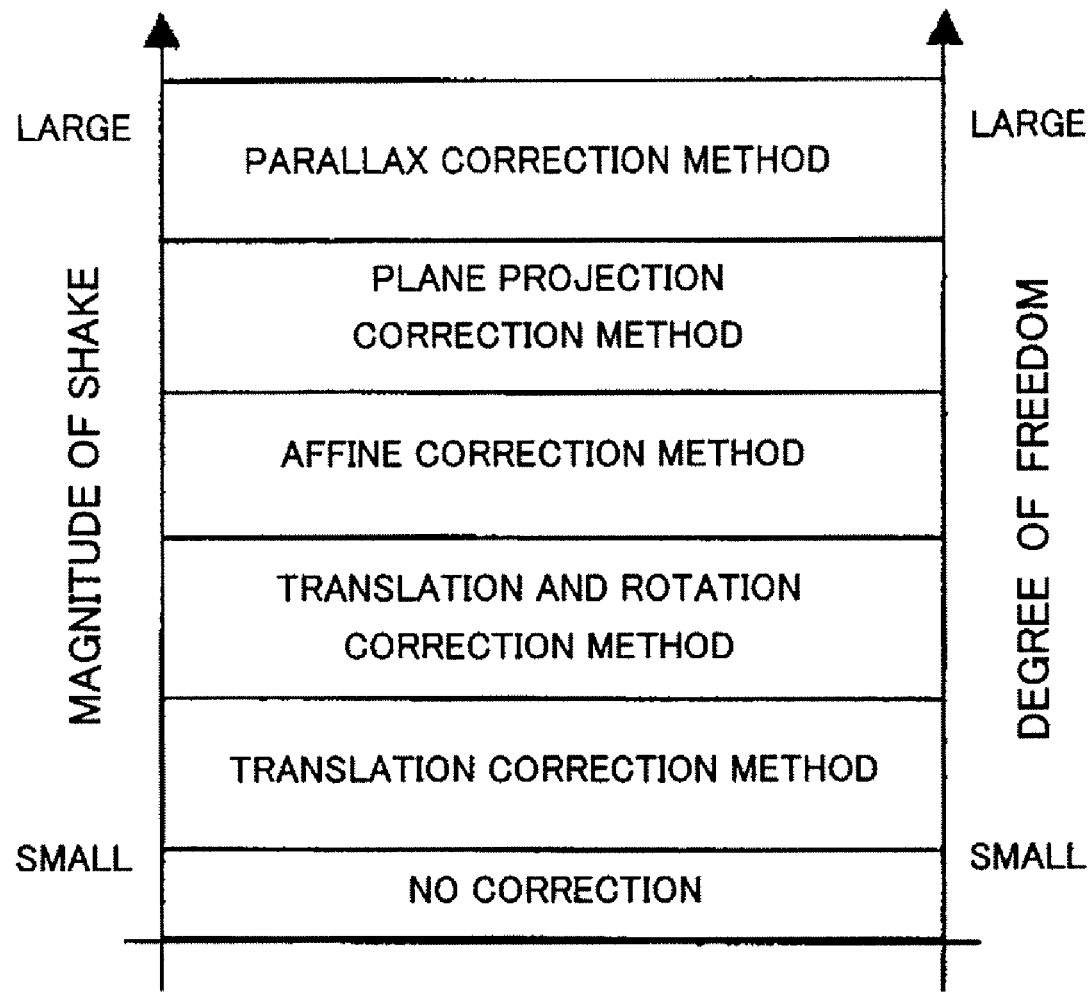
FIG. 3 illustrates the relation between amount of shake and shake correction methods.

Here, description will be given of how to select a shake correction method in this embodiment. FIG. 3 illustrates the relation between amount of shake (i.e., magnitude of shake) and a corresponding shake correction method optimal for it. Apparent shake occurring on an image results from shake of the image-pickup apparatus itself and characteristics of apparent shake occurring on an image vary with the magnitude or type of shake of the image-pickup apparatus itself. This embodiment uses the amount of apparent shake occurring on an image to estimate the magnitude of shake of the image-pickup apparatus itself and determines a shake correction method of how much degree of freedom should be applied.

Specifically, the correction method selection circuit 112 selects a shake correction method to be applied by determining a representative motion vector that represents motion of the entire image that is output, by the shake analysis part 109.

First, if determination of the representative vector shows that amount of shake is small and no shake due to rotation around the optical axis and zooming is occurring on the image, a correction method based on translation transformation that is one of coordinate transformation methods, is selected (hereinafter referred to as "translation correction method").

Translation correction method is a method that corrects shake on an image by shifting the image in vertical and horizontal directions.

For example, assume that a point on an image $$a=[x,y,1]^T$$

moves to a point $$a'=[x',y',1]^T$$

due to translational shake:

$$T=[T_x,T_y,1]^T$$

In this case, to correct translational shake T, point a' should be translated in a direction opposite to the shake:

$$T'=[-T_x,-T_y,1]^T$$

Thus, translation correction can be expressed as:

$$a = a' + T' \quad \text{(Expression 1)}$$

$$\begin{bmatrix} x \\ y \\ 1 \end{bmatrix} = \begin{bmatrix} x' \\ y' \\ 1 \end{bmatrix} + \begin{bmatrix} -T_x \\ -T_y \\ 0 \end{bmatrix} \quad \text{(Expression 2)}$$

The value of translational shake T can be calculated from amount of shake between successive frame images that is sent from the shake analysis part 109.

Points a and a' and translational shake T are expressed using homogeneous coordinates. The same applies to the following description as well.

While it is assumed here that shake can be corrected by translation correction method when amount of shake is small, in reality, panning/tilting shake may be occurring in addition to translational shake. However, when shake of the image-pickup apparatus itself is minute, panning/tilting shake can be approximated to translational shake.

Figure 4:
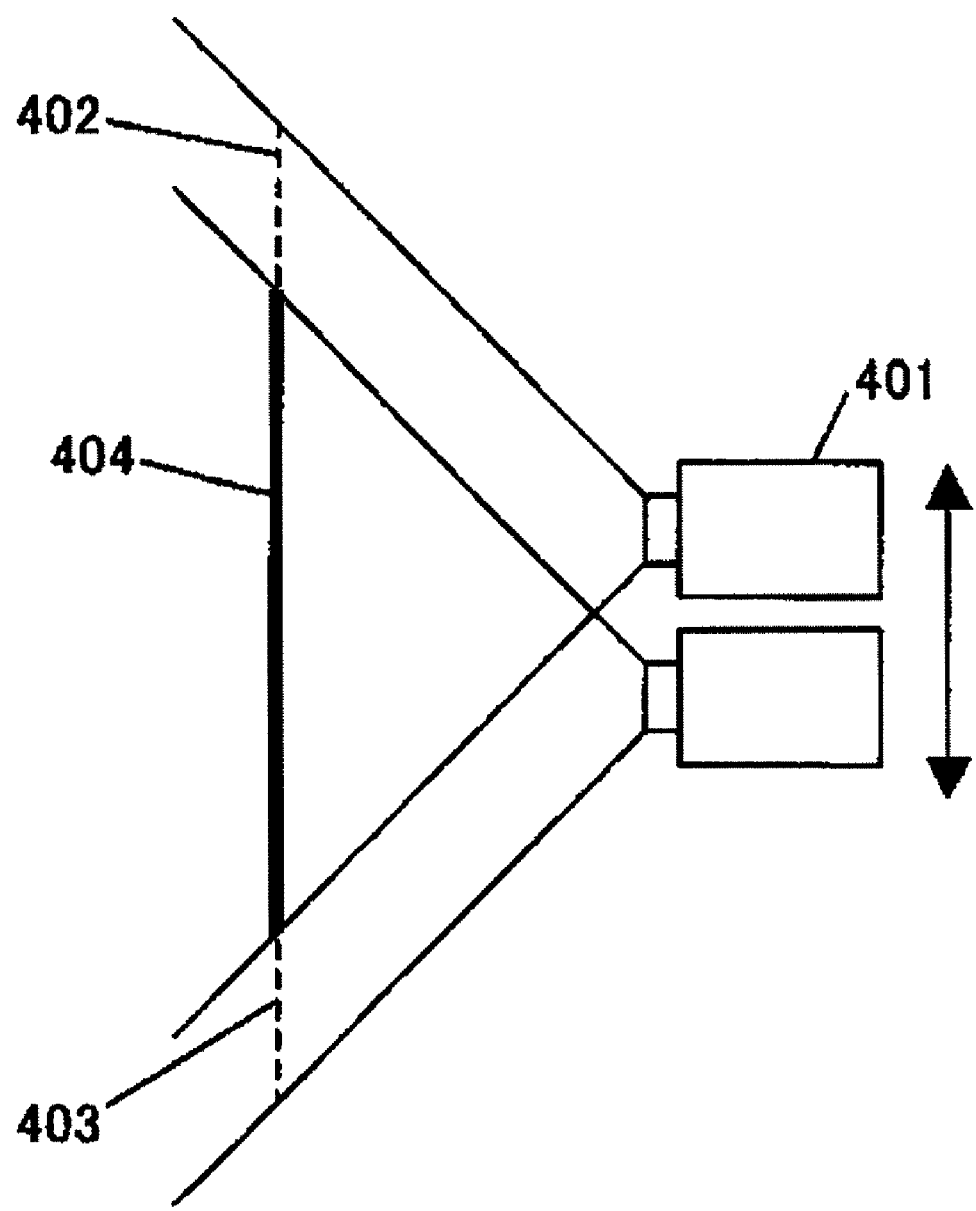
FIG. 4 illustrates positional relation between an image-pickup apparatus and image-pickup planes when translational shake is occurring.
Figure 5:
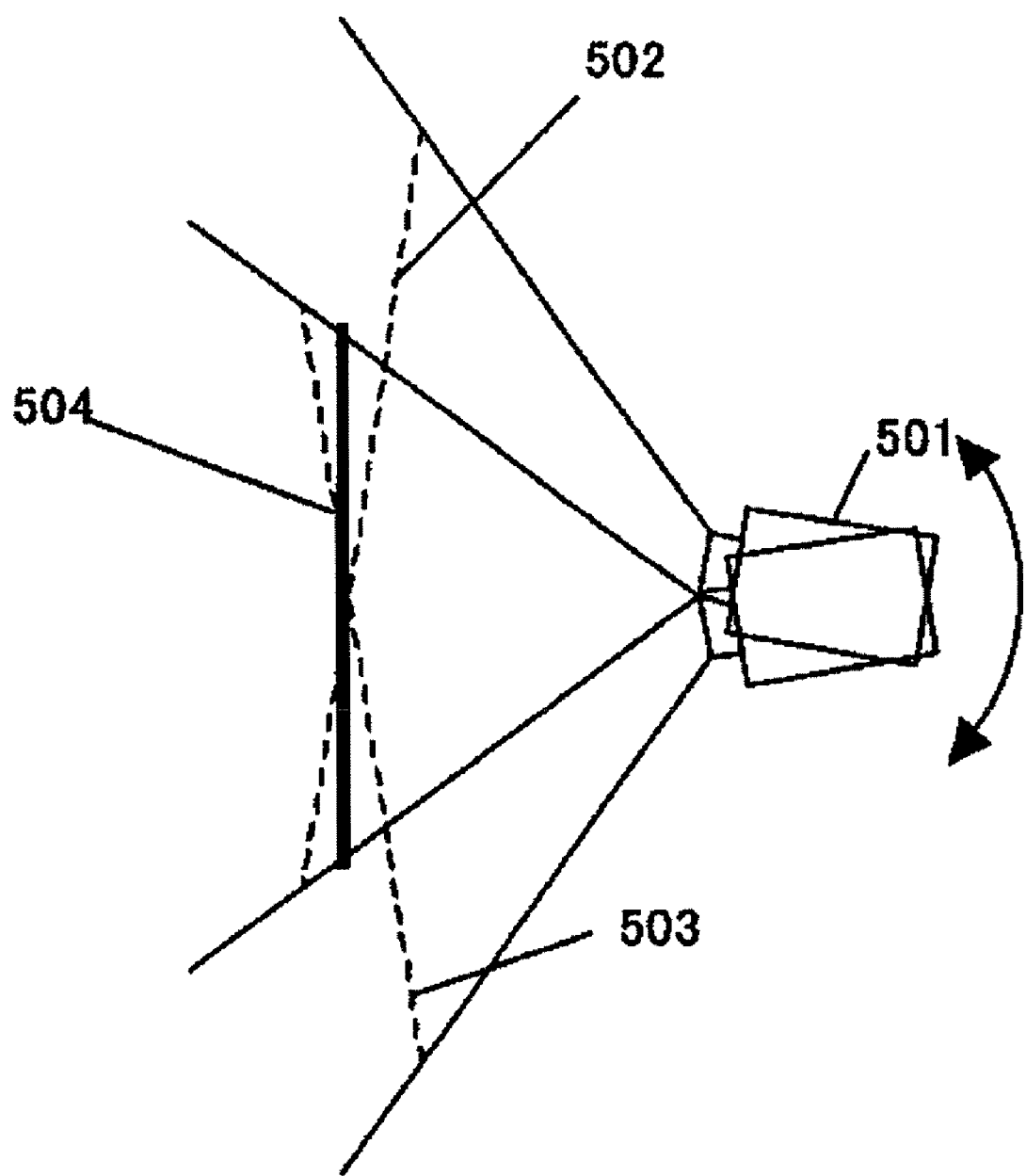
FIG. 5 illustrates positional relation between an image-pickup apparatus and image-pickup planes when large panning shake is occurring.

FIG. 4 illustrates the relation between an image-pickup apparatus that is having translational shake and displacement of an image-pickup plane. As illustrated in the figure, when translational shake is occurring on the image-pickup apparatus 401, image-pickup planes 402 and 403 before and after the shake move on the same plane to form a common (i.e., overlapping) area 404. In contrast, as illustrated in FIG. 5, when large panning/tilting shake occurs on the image-pickup apparatus 501, inclination occurs between image-pickup planes 502 and 503 before and after the shake. Consequently, a common area such as the one shown at 504 of FIG. 5 is not formed and apparent shake on an image is different from translational shake.

Figure 6:
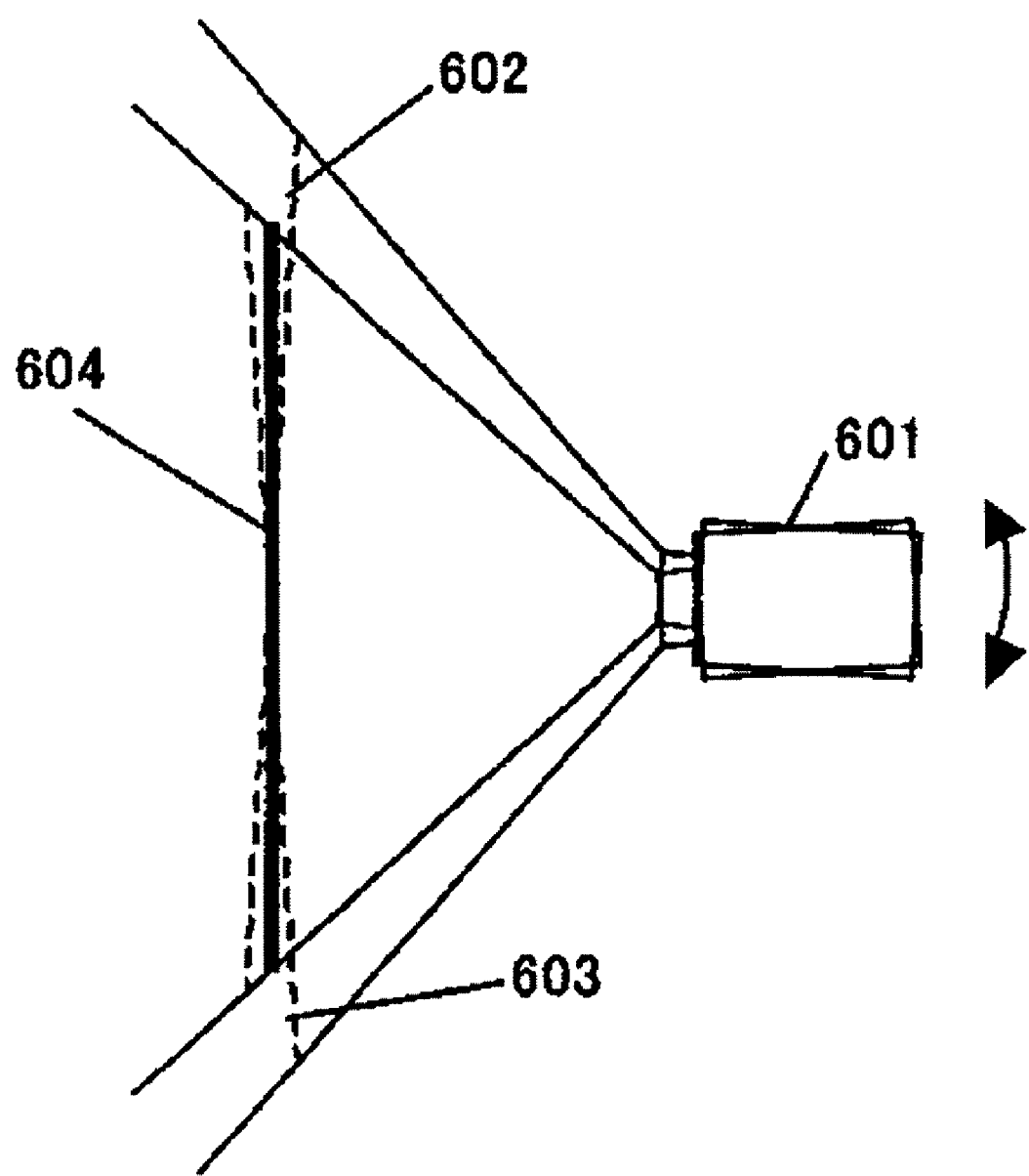
FIG. 6 illustrates positional relation between an image-pickup apparatus and image-pickup planes when small panning shake is occurring.

However, as illustrated in FIG. 6, when shake of the image-pickup apparatus 601 itself is minute, approximation is possible in which image-pickup planes 602 and 603 before and after panning/tilting shake move on the same plane to form a common area 604. Accordingly, accurate shake correction can be made even if both translational shake and panning/tilting shake are corrected by translation correction method.

When rotational shake around the optical axis is occurring in addition to translational shake described above, a correction method based on translation and rotation transformation that is one of coordinate transformation methods, is selected (hereinafter referred to as "translation and rotation correction method").

Translational shake is corrected using T' for translation correction described above. On the other hand, rotational shake is corrected in the following manner. For example, when rotation of the image-pickup apparatus by an angle θ occurs around the optical axis, rotational shake R can be expressed as:

$$R = \begin{bmatrix} \cos\theta & -\sin\theta & 0 \\ \sin\theta & \cos\theta & 0 \\ 0 & 0 & 1 \end{bmatrix} \quad \text{(Expression 3)}$$

Thus, translation and rotation correction can be expressed as:

$$a=R^{-1}a'+T' \quad \text{(Expression 4)}$$

The value of rotational shake R can be calculated from the amount of shake between successive frame images that is sent from the shake analysis part 109. Translation and rotation transformation is generally called Euclidean transformation.

When zooming shake and shearing shake are also occurring in addition to translational shake and rotational shake around the optical axis described above, a correction method based on affine transformation that is one of coordinate transformation methods, is selected (hereinafter referred to as "affine correction method"). Affine transformation can be expressed by the matrix below:

$$H_a = \begin{bmatrix} h_{11} & h_{12} & h_{13} \\ h_{21} & h_{22} & h_{23} \\ 0 & 0 & 1 \end{bmatrix} \quad \text{(Expression 5)}$$

Thus, assuming that point a on the image moves to point a' due to shake Ha expressed by the affine matrix above, affine correction for correcting it can be expressed as:

$$a=H_a^{-1}a' \quad \text{(Expression 6)}$$

Values of elements of shake Ha expressed by the affine matrix can be calculated from the amount of shake between successive frame images that is sent from the shake analysis part 109.

When shake involving trapezoidal deformation is occurring in addition to shake that can be expressed by affine transformation described above, a correction method based on plane projection transformation that is one of coordinate transformation methods, is selected (hereinafter referred to as "plane projection correction method"). Shake involving trapezoidal deformation occurs when the amount of shake on an image is large. In such a situation, positions of the image-pickup planes 502 and 503 before and after panning/tilting widely incline as shown in FIG. 5. Thus, approximation between translational shake and panning/tilting shake discussed above does not hold.

Accordingly, it is necessary to select plane projection correction method that can handle translational shake and panning/tilting shake separately. Plane projection transformation can be expressed by the matrix below:

$$H_P = \begin{bmatrix} h_{11} & h_{12} & h_{13} \\ h_{21} & h_{22} & h_{23} \\ h_{31} & h_{32} & h_{33} \end{bmatrix} \quad \text{(Expression 7)}$$

Assuming that point a on the image moves to point a' due to shake Hp which is expressed by the plane projection matrix above, plane projection correction for correcting it can be expressed as:

$$a = H_p^{-1} a' \quad \text{(Expression 8)}$$

Values of elements of shake Hp expressed by the plane projection matrix can be calculated from the amount of shake between successive frame images that is sent from the shake analysis part 109.

Further, when shake correction is made taking into consideration the depth of an image-taken scene, so-called parallax correction method is selected.

Each of the methods described above from translational correction method to plane projection correction method is a correction method that approximates an image-taken scene to be a plane. However, when difference in depth of an image-taken scene is large, that is, difference in distance to subjects contained in the image-taken scene is large, it is difficult to assume that all the subjects are on the same plane.

Figure 7:
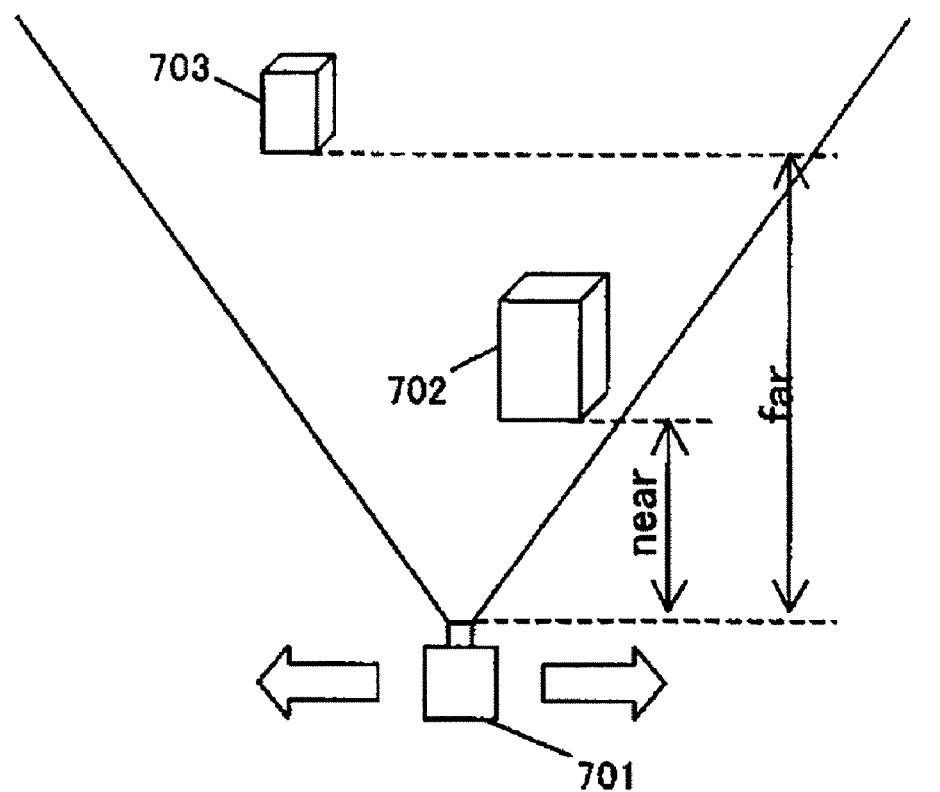
FIG. 7 illustrates apparent shake that appears on an image when a scene has different depths.
Figure 7:
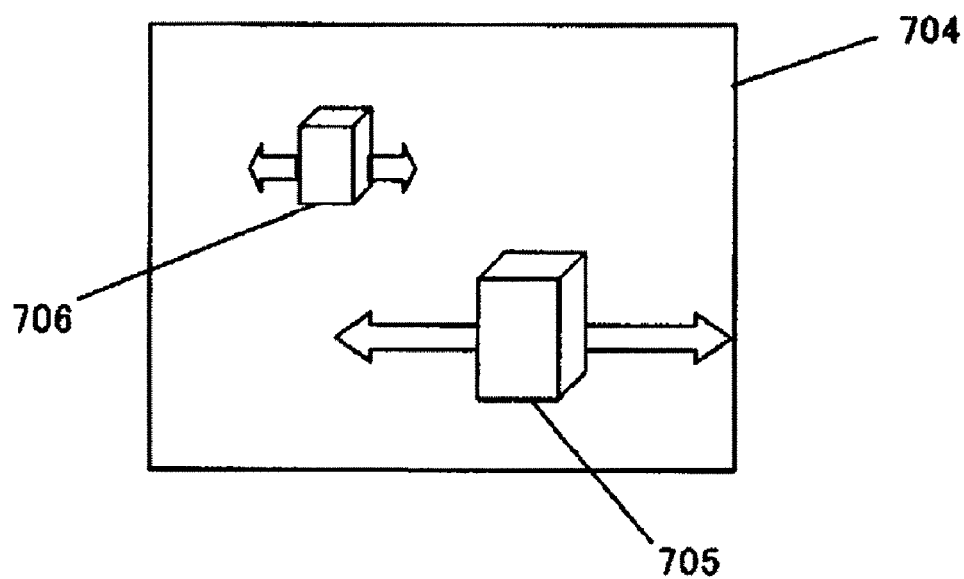

That is, as illustrated in FIG. 7, consider an image-taken scene in which an object 702 is present near an image-pickup apparatus 701 and an object 703 is present far from the apparatus 701. In this case, when the image-pickup apparatus 701 moves, the amount of apparent movement of the object 705 which is close to the image-pickup apparatus 701 becomes larger, and, on the contrary, that of the object 706 which is far from the apparatus 701 becomes smaller, on a taken image 704 obtained from the image-pickup apparatus 701.

In such a situation, a properly shake-corrected image cannot be produced even if only one of methods from translational correction to plane projection correction is applied to one frame image. Thus, it is necessary to apply shake correction processing that takes into consideration of difference in nature of shake that results from difference in depth.

In this embodiment, a method that applies segmentation to an image and classifies subjects according to their distances from the image-pickup apparatus so that an optimal correction method is applied to the respective subjects is referred to as a parallax correction method. The parallax correction method selects a correction method (a coordinate transformation method) optimal for the amount of shake calculated for each pixel, or measures the distances to subjects using a distance measuring sensor, e.g., an infrared sensor, to select a correction method optimal for each of the distances.

When the amount of shake on an image is minute and is determined to be a negligible motion, shake correction itself may not be performed, as illustrated in FIG. 3.

The translational correction and translation and rotation correction methods thus far described are shake correction methods having low degree of freedom that assume that, when shake of the image-pickup apparatus itself is minute, shake that can be approximated to another shake or that can be neglected is present. In this case, since only a few parameters are required for shake correction, robust and fast processing is possible.

However, as shake becomes larger, the above-described approximation does not hold and thus a correction method of low degree of freedom would reduce the accuracy of correction. Therefore, as shake is larger, a shake correction method of higher degree of freedom, e.g., affine correction and plane projection, and further parallax correction methods, should be selected. This can maintain high accuracy of shake correction.

Figure 8:
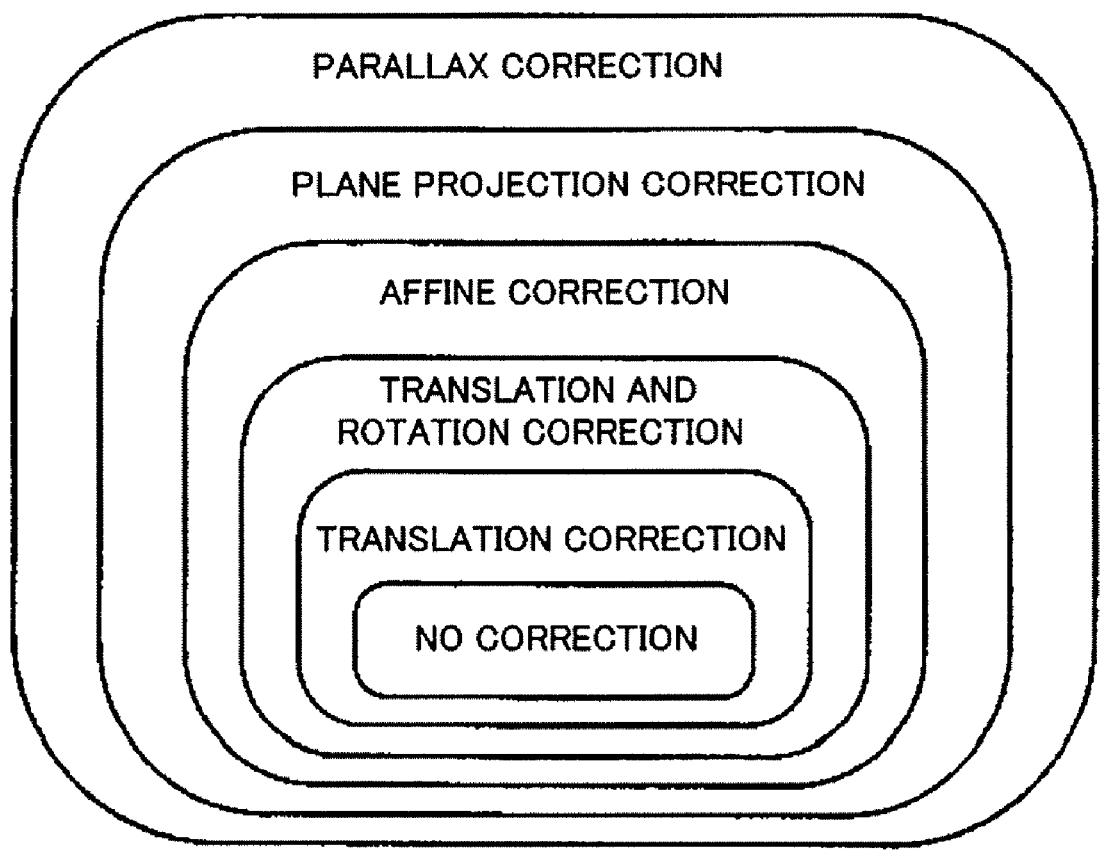
FIG. 8 illustrates relation of encompassing among shake correction methods.

Also, as shown in FIG. 8, in this embodiment, a correction method of higher degree of freedom encompasses a correction method of lower degree of freedom. Because of this, even for an area for which parallax correction method should be selected in FIG. 3, for example, translation correction method may be used for correction if it is determined that only translational shake is occurring on the image as apparent shake.

In FIG. 2, at step S204, the shake correction circuit 113 performs shake correction processing (coordinate transformation processing) using a shake correction method selected at step S203. The expression for the selected shake correction method is applied to each pixel of the target image and coordinate values after shake correction are calculated, thereby generating coordinate value transformation data for shake correction. Then, based on the generated coordinate value transformation data, pixel values are read out from the image stored and held in the frame memory 107, and an image that is formed by those pixel values is transmitted to the video output circuit 114 as a shake-corrected image.

At step S205, the shake-corrected image is output from the video output circuit 114.

As has been thus described, this embodiment selects an optimal shake correction method from among the plural shake correction methods by utilizing the fact that characteristics of a motion vector, which represents shake occurring on an image, vary with the amount of shake. This can realize electronic image stabilization that can perform proper shake correction despite change in characteristics of shake of an image-pickup apparatus, i.e., image-taking conditions.

Embodiment 2

Figure 9:
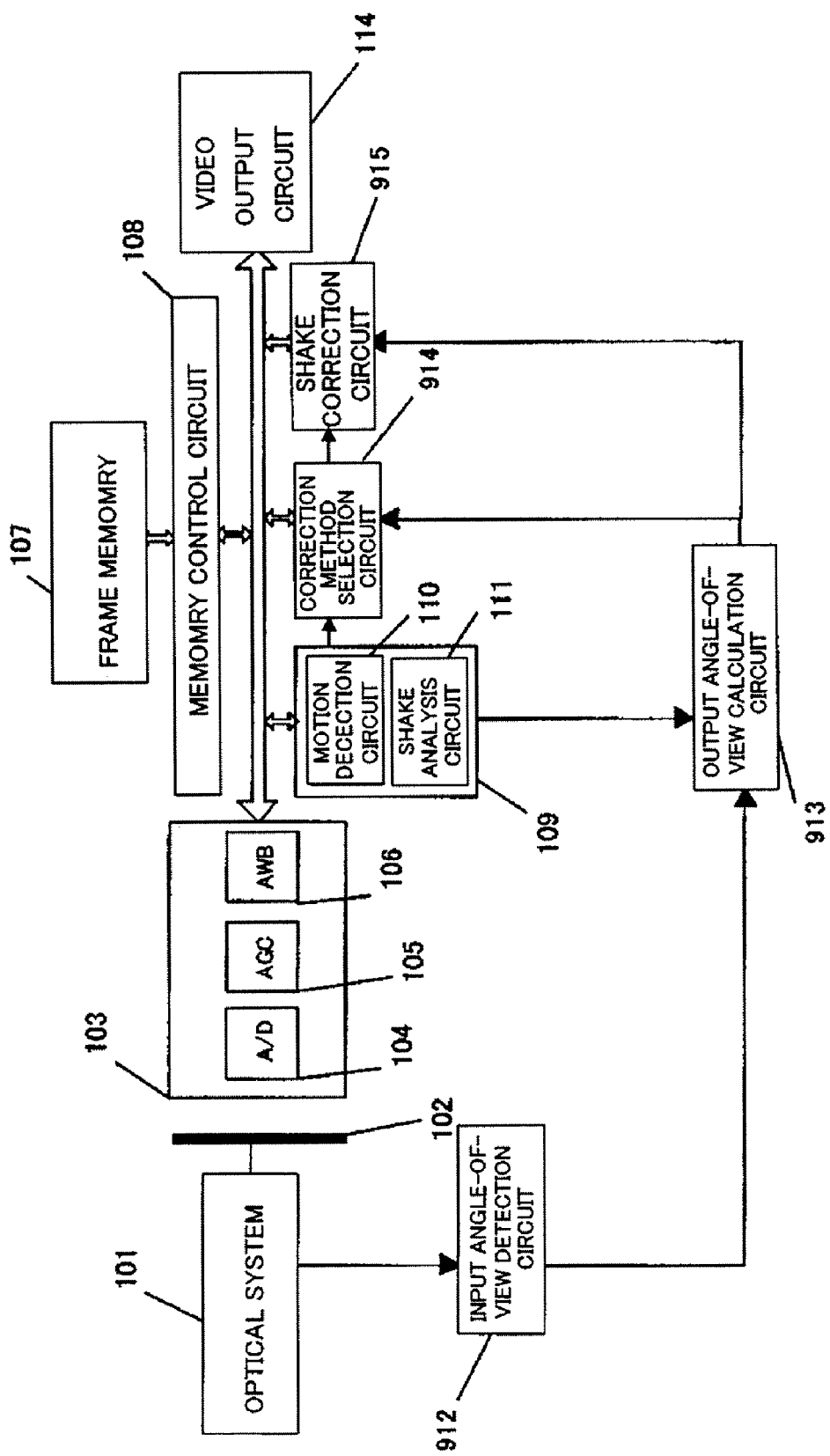
FIG. 9 shows the configuration of an image-pickup apparatus as the second embodiment of the invention.

FIG. 9 shows the configuration of an image-pickup apparatus that includes an image processing apparatus as the second embodiment of the present invention. This embodiment selects an optimal shake correction method based on the amount of shake on an image and the angle of view of an output image (as well as the angle of view of an input image).

In FIG. 9, components common to those shown in FIG. 1 are denoted with the same reference numerals as in FIG. 1. In addition to the configuration shown in FIG. 1, the image-pickup apparatus of the embodiment includes an input angle-of-view detection circuit 912 for detecting the angle of view of an input image (hereinafter "an input angle of view") that is formed by the image forming circuit 103. The image-pickup apparatus also includes an output angle-of-view calculation circuit (output area determination part) 913 for calculating the angle of view for outputting an image (an output image area, hereinafter referred to as an "output angle of view") which has been subjected to shake correction at the shake correction circuit 915, using the input angle of view and the amount of shake calculated by the shake analysis part 109. The main controller illustrated in FIG. 1 is omitted in FIG. 9.

The operation of the image-pickup apparatus (image processing apparatus) of the embodiment will be described below with respect to the flowchart shown in FIG. 10.

Steps S1001 and S1002 are similar to steps S201 and S202 shown in the first embodiment (FIG. 2), respectively.

At S1003, the output angle-of-view calculation circuit 913 calculates the output angle of view in advance that is used when the shake-corrected image is sent to the video output circuit 114. The output angle of view is calculated using the input angle of view detected by the input angle-of-view detection circuit 912 and the amount of shake calculated by the shake analysis part 109. The input angle of view is calculated based on positional information for lenses constituting the optical system 101 and focal length information of the optical system 101. The calculated output angle of view is sent to the correction method selection circuit 914 and the shake correction circuit 915.

At step S1004, using the amount of shake provided by the shake analysis part 109 and the output angle of view provided by the output angle-of-view calculation circuit 913, shake that is occurring in the image currently being taken is analyzed. And a shake correction method optimal for correcting the shake is selected.

In this embodiment, an area of an input image that will be actually output is selected as a take-out area of an output image. Then, using an optimal shake correction method, shake correction is performed by moving and deforming the take-out area within the input image depending on the shake. Use of such a method can prevent missing of pixels in an output image due to shake correction.

The size of a take-out area, that is, the angle of view of an output image, can be determined from its proportion to the size of an input angle of view, for example. Alternatively, it is also possible to analyze the amount of apparent shake appearing on an image to calculate an output angle of view at which a take-out area does not lie outside the range of an input image even if shake correction is applied, for example.

In a case where the size of an output angle of view is selected so that better shake correction can be made, when the size of the output angle of view is changed, characteristics of apparent shake appearing on the image also change.

Figure 11:
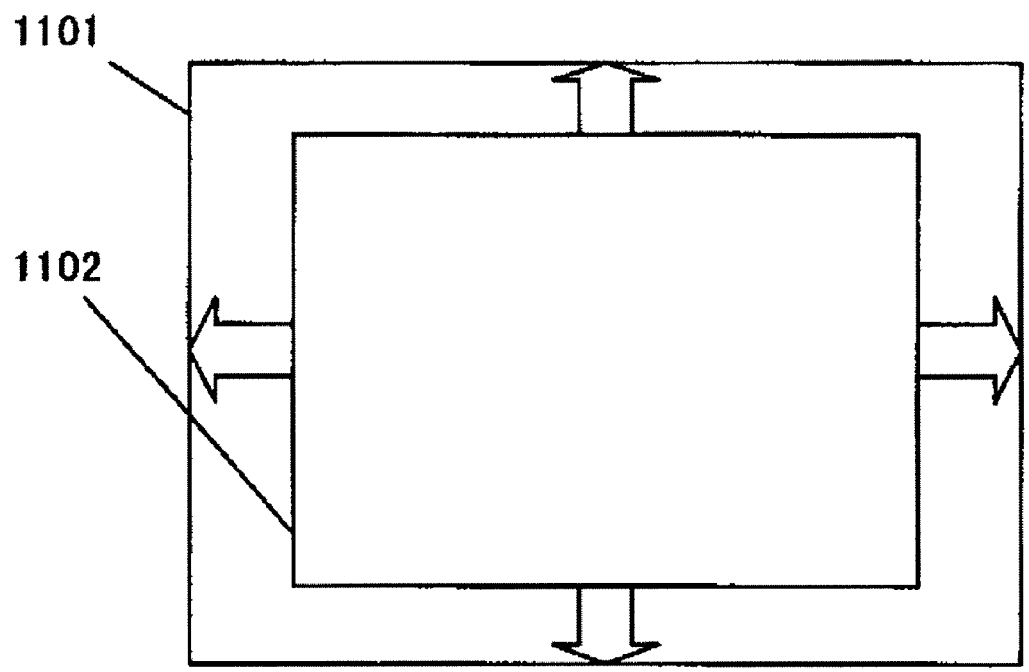
FIG. 11 illustrates a range in which shake correction is possible when an output angle of view is large.

For instance, as illustrated in FIG. 11, when the proportion of the angle of view of an output image 1102 is large relative to the angle of view of an input image 1101, the range in which a take-out area of the output image can move is small. Thus, only small shake can be corrected.

Figure 12:
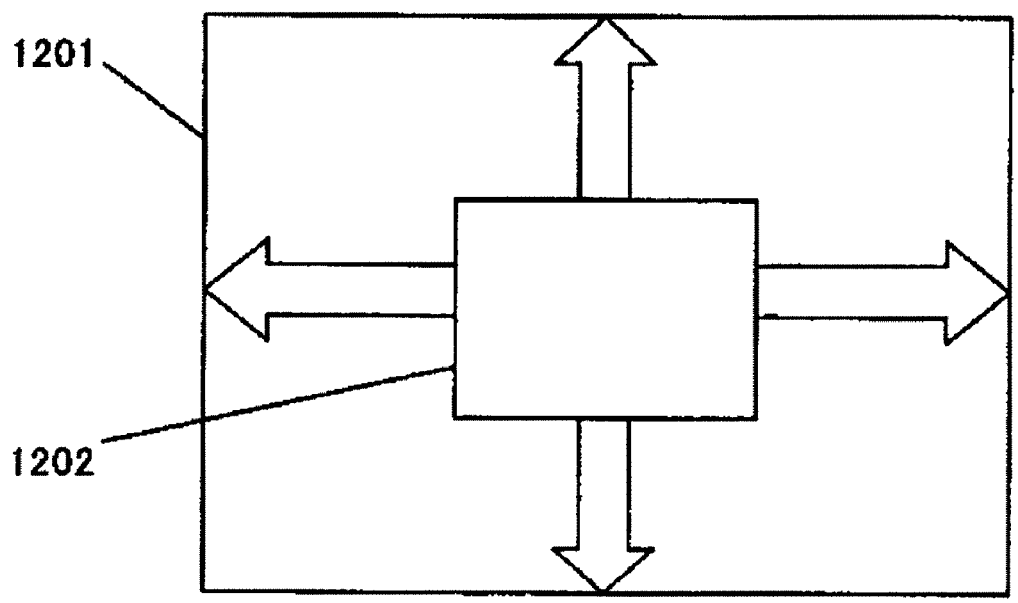
FIG. 12 illustrates a range in which shake correction is possible when an output angle of view is small.

In contrast, when the proportion of the angle of view of an output image 1202 is small relative to the angle of view of an input image 1201 as shown in FIG. 12, the range in which a take-out area of the output image can move is large. Thus, large shake can be also corrected.

If there is a motion having such a magnitude that would cause a take-out area to lie outside the range of the input image if correction is performed, the motion is determined to be uncorrectable shake or an intentional camera work and excluded from shake correction.

Figure 13:
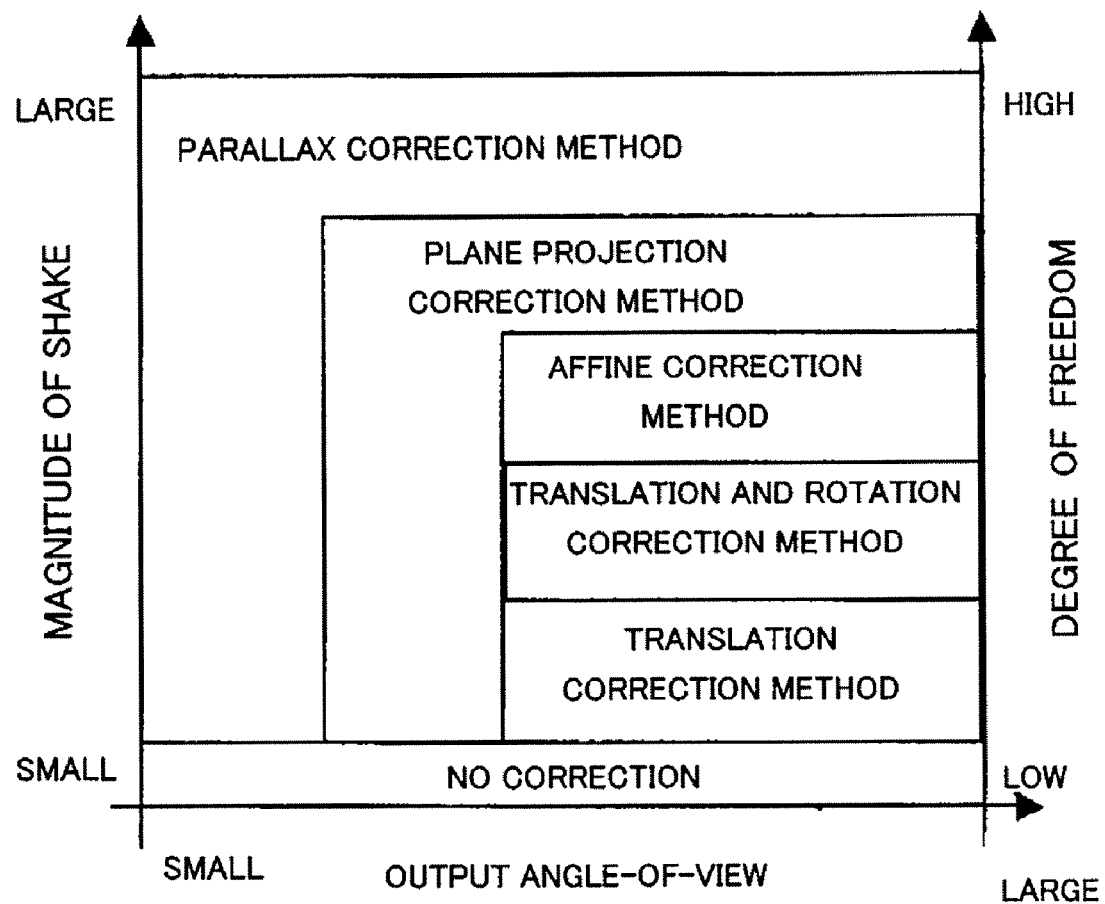
FIG. 13 illustrates relation among amount of shake, the size of an output angle of view, and shake correction methods.

Now, description will be given of how to select a shake correction method in this embodiment. FIG. 13 shows the relation among magnitude of shake, the size of an output angle of view, and a corresponding shake correction method optimal for them.

As seen from the figure, when an output angle of view is set to be large, the amount of correctable shake appearing on the image is small, so that small shake of the image-pickup apparatus itself should be corrected. Thus, a shake correction method of low degree of freedom, such as translation correction and translation and rotation correction methods, is selected. This enables robust and fast shake correction. On the other hand, when the output angle of view is set to be small, the amount of correctable shake appearing on an image is large, so that large shake of the image-pickup apparatus itself should be corrected. Thus, a shake correction method of high degree of freedom, such as affine correction, plane projection correction, and further parallax correction methods, is selected. This can realize accurate shake correction that also addresses complicated shake.

Figure 10:
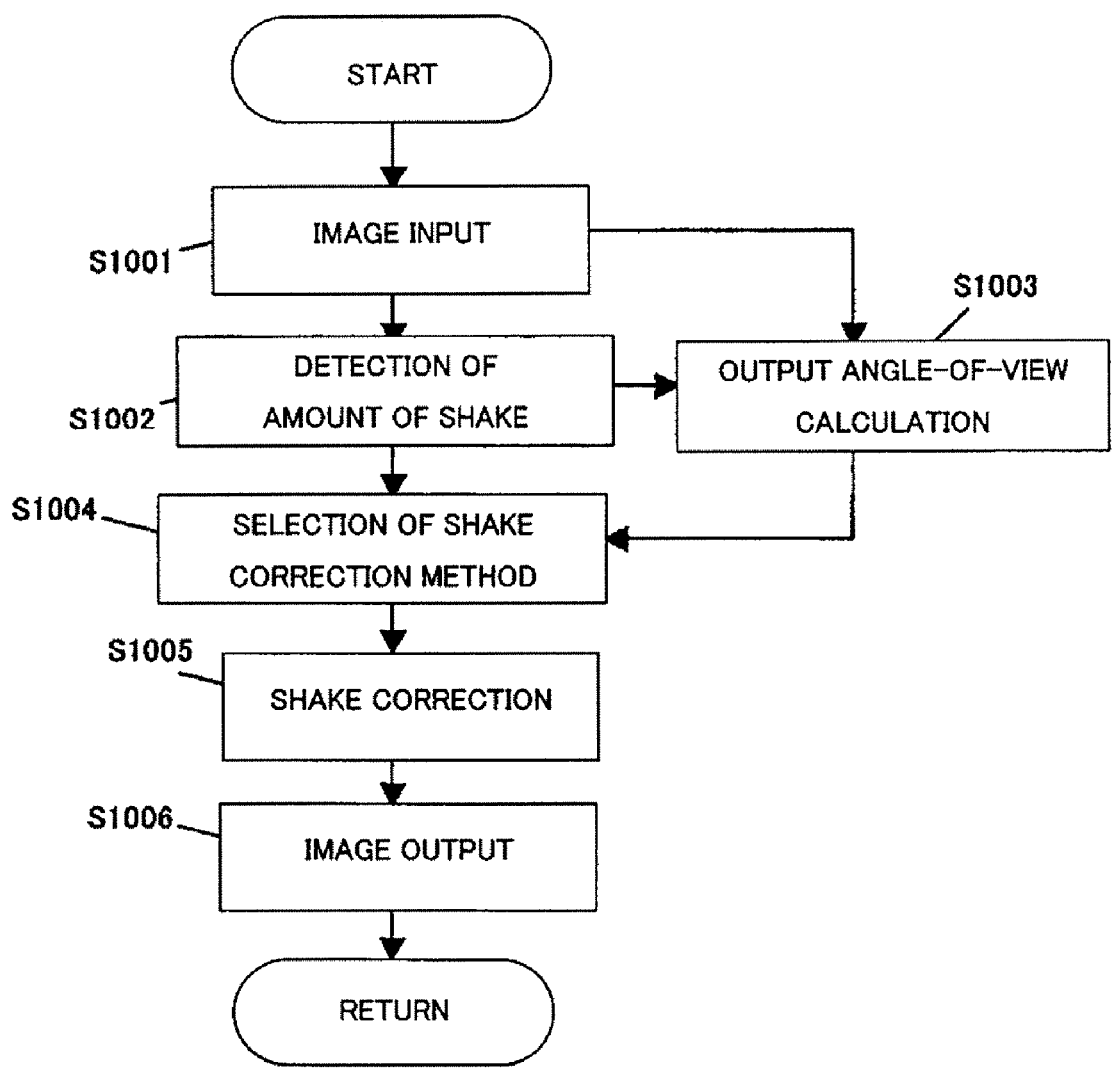
FIG. 10 is a flowchart illustrating shake correction processing in the second embodiment.

In FIG. 10, at step S1005, the shake correction circuit 915 applies shake correction processing using the shake correction method selected at step S1004. The expression for the selected shake correction method is applied to each pixel of the target image and coordinate values after shake correction are calculated to generate coordinate value transformation data for shake correction. Based on the generated coordinate value transformation data and the size of the output angle of view calculated in advance by the output angle-of-view calculation circuit 913, pixel values are taken out from the image stored and held in the frame memory 107. Then, an image that is formed by those pixel values is sent to the video output circuit 916 as a shake-corrected image.

At step S1006, the shake-corrected image is output from the video output circuit 114.

As has been thus described, according to the embodiment, an optimal shake correction method is selected by utilizing the fact that characteristics of a motion vector that represents shake appearing on an image vary with the amount of shake and the size of an output angle of view. This can realize electronic image stabilization that can perform proper shake correction despite change in shake characteristics of an image-pickup apparatus.

Embodiment 3

Figure 14:
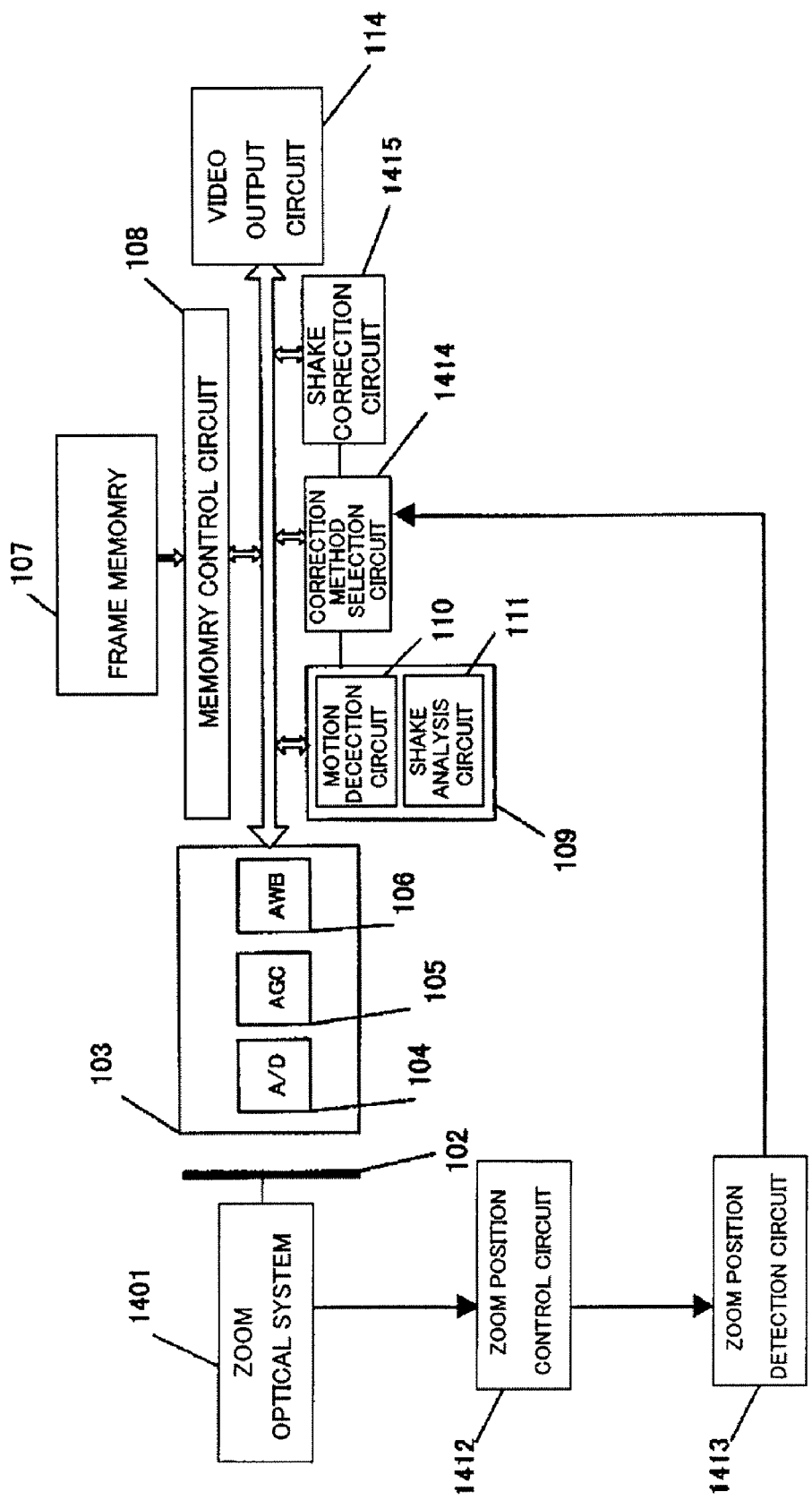
FIG. 14 shows the configuration of an image-pickup apparatus as the third embodiment of the invention.

FIG. 14 shows the configuration of an image-pickup apparatus that includes an image processing apparatus as the third embodiment of the present invention. This embodiment has a zoom optical system with variable focal length and selects an optimal shake correction method according to the amount of shake on an image and the zooming position (i.e. focal length) of the zoom optical system.

In FIG. 14, components common to those shown in FIG. 1 are denoted with the same reference numerals as in FIG. 1. The image-pickup apparatus of the embodiment includes a zoom position control circuit 1412 for controlling the zoom position of the zoom optical system 1401 and a zoom position detection circuit 1413 for detecting the zoom position, in addition to the configuration shown in FIG. 1. The main controller shown in FIG. 1 is omitted in FIG. 9.

The operation of the image-pickup apparatus (image processing apparatus) of the embodiment will be described below with the flowchart shown in FIG. 15.

Steps S1501 and S1502 are similar to steps S201 and S202 shown in the first embodiment (FIG. 2), respectively.

At step S1503, the zoom position of the zoom optical system 1401 is controlled by the zoom position control circuit 1412 in accordance with operation of a zoom switch, not shown, by a user. Also, the zoom position is detected by the zoom position detection circuit 1413. Detected zoom position information is sent to the correction method selection circuit 1414.

Here, description will be given of how to selects a shake correction method in this embodiment. When the zoom position of the zoom optical system 1401 is changed, characteristics of apparent shake on an image change. Shake that appears on an image results from shake of the image-pickup apparatus itself, and when the zoom position is moved to telephoto side for example, the displayed image enlarges and the amount of apparent shake on the image also increases. Thus, even when shake of the same size is occurring both on a telephoto image and a wide-angle image, the magnitude of actual shake of the image-pickup apparatus itself is smaller when the apparatus is taking the telephoto image.

That there is difference in the magnitude of shake of the image-pickup apparatus itself means that there is difference in characteristics of apparent shake appearing on an image as well. Thus, by analyzing shake characteristics using the amount of shake and the zoom position information, it is possible to estimate the magnitude of shake of the image-pickup apparatus itself and determine a shake correction method of how much degree of freedom should be applied.

Figure 16:
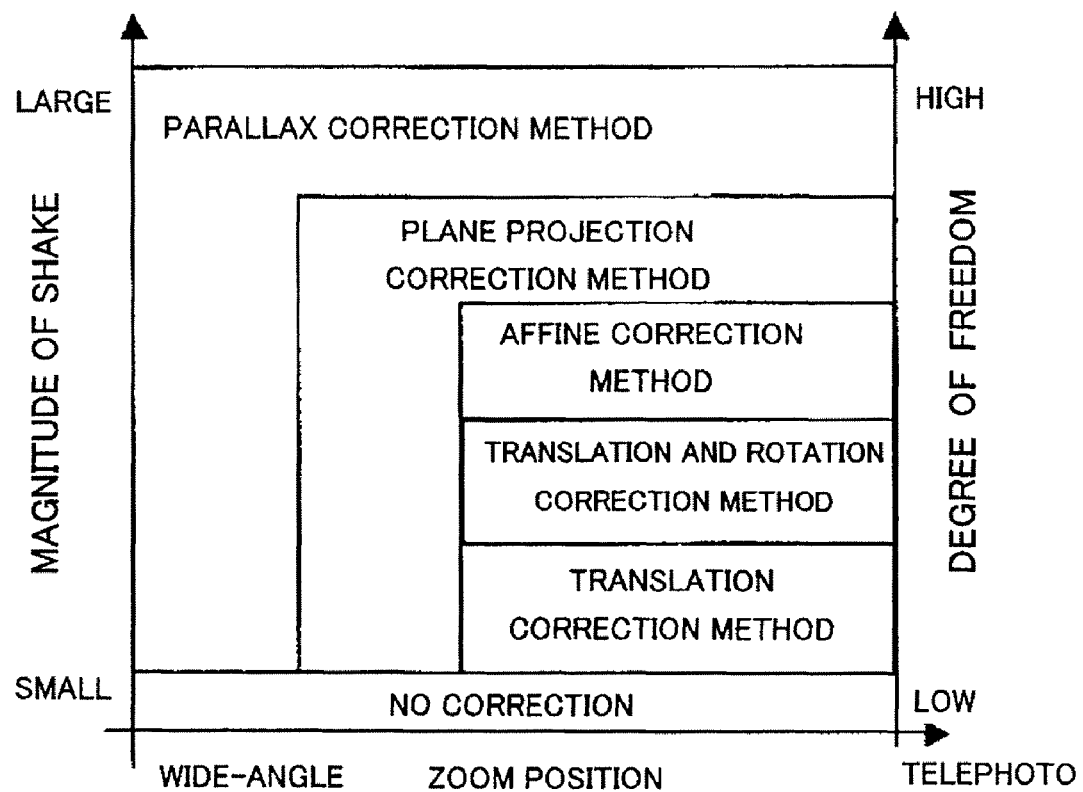
FIG. 16 illustrates relation between amount of shake and shake correction methods.

FIG. 16 shows the relation between the amount of shake and the zoom position of the zoom optical system 1401, and shake correction methods optimal for them in this embodiment.

As seen from the figure, when the zoom position is telephoto side and the amount of shake is small, the amount of shake remains small despite enlarged shake due to telephoto image-taking. Thus, shake of the image-pickup apparatus itself is estimated to be minute. It follows that approximation between translational shake and panning/tilting shake does hold and a correction method of low degree of freedom can be selected, e.g., translation correction and translation and rotation correction methods. This enables robust and fast shake correction processing.

On the other hand, as the zoom position moves to wide-angle side or the amount of shake is larger, shake of the image-pickup apparatus itself becomes larger. Thus, the above-described approximation does not hold and shake including more complicated motion occurs. For such shake, more accurate shake correction can be realized by selecting a shake correction method of higher degree of freedom such as affine correction, plane projection correction, and further parallax correction methods.

Figure 15:
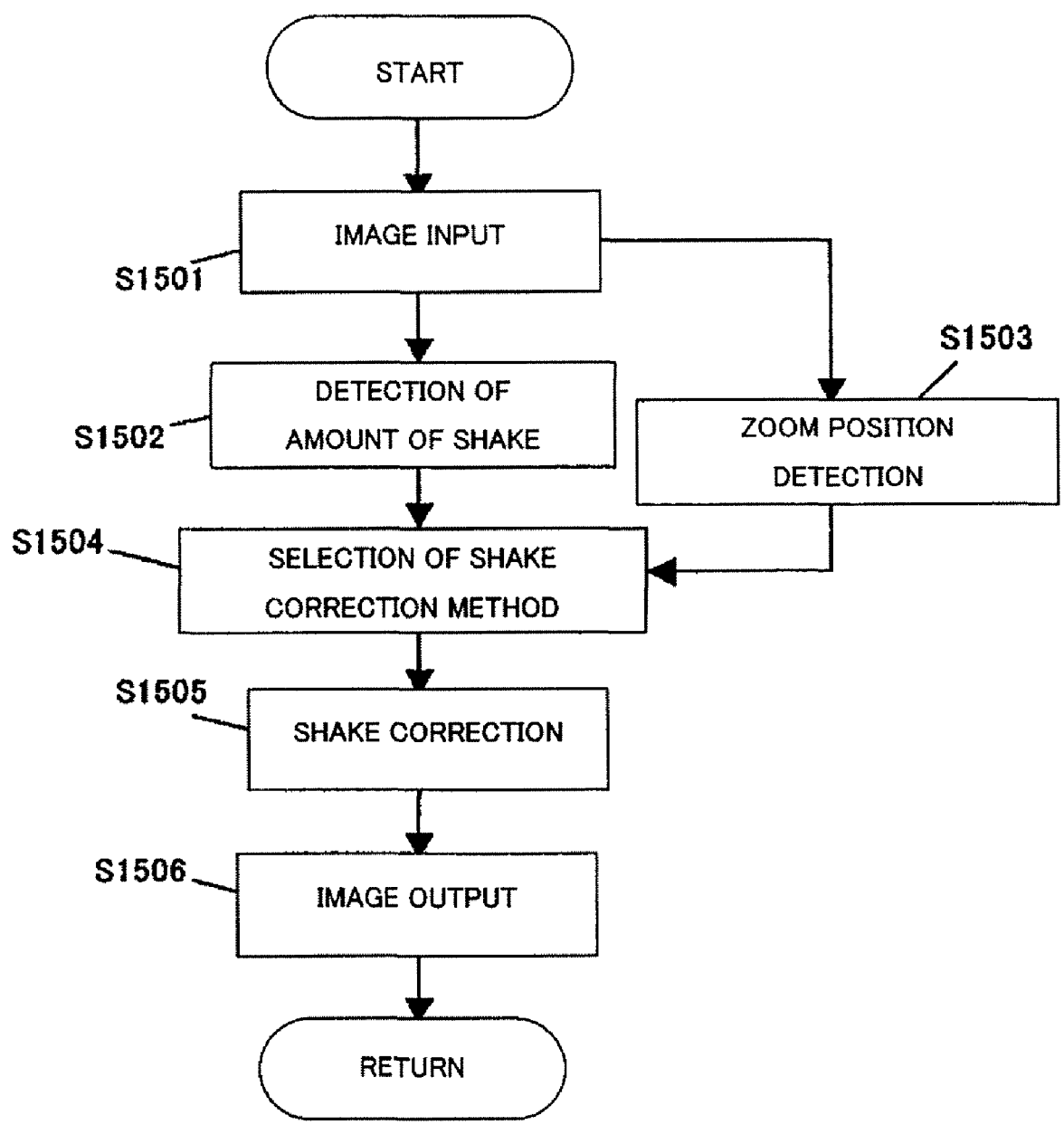
FIG. 15 is a flowchart illustrating shake correction processing in the third embodiment.

In FIG. 15, at step S1505, the shake correction circuit 1415 applies shake correction processing using a shake correction method selected at step S1504. The expression for the selected shake correction method is applied to each pixel of the target image and coordinate values after shake correction are calculated to generate coordinate value transformation data for shake correction. Then, based on the generated coordinate value transformation data, pixel values are read out from an image stored and held in the frame memory 107 and an image that is formed by those pixel values is sent to the video output circuit 114 as a shake-corrected image.

At step S1506, the shake-corrected image is output from the video output circuit 114.

As has been thus described, this embodiment selects an optimal shake correction method by utilizing the fact that characteristics of a motion vector that represents shake appearing on an image vary with the amount of shake and/or the zoom position. This can realize electronic image stabilization that can perform proper shake correction even if shake characteristics of the image-pickup apparatus change.

Embodiment 4

Figure 17:
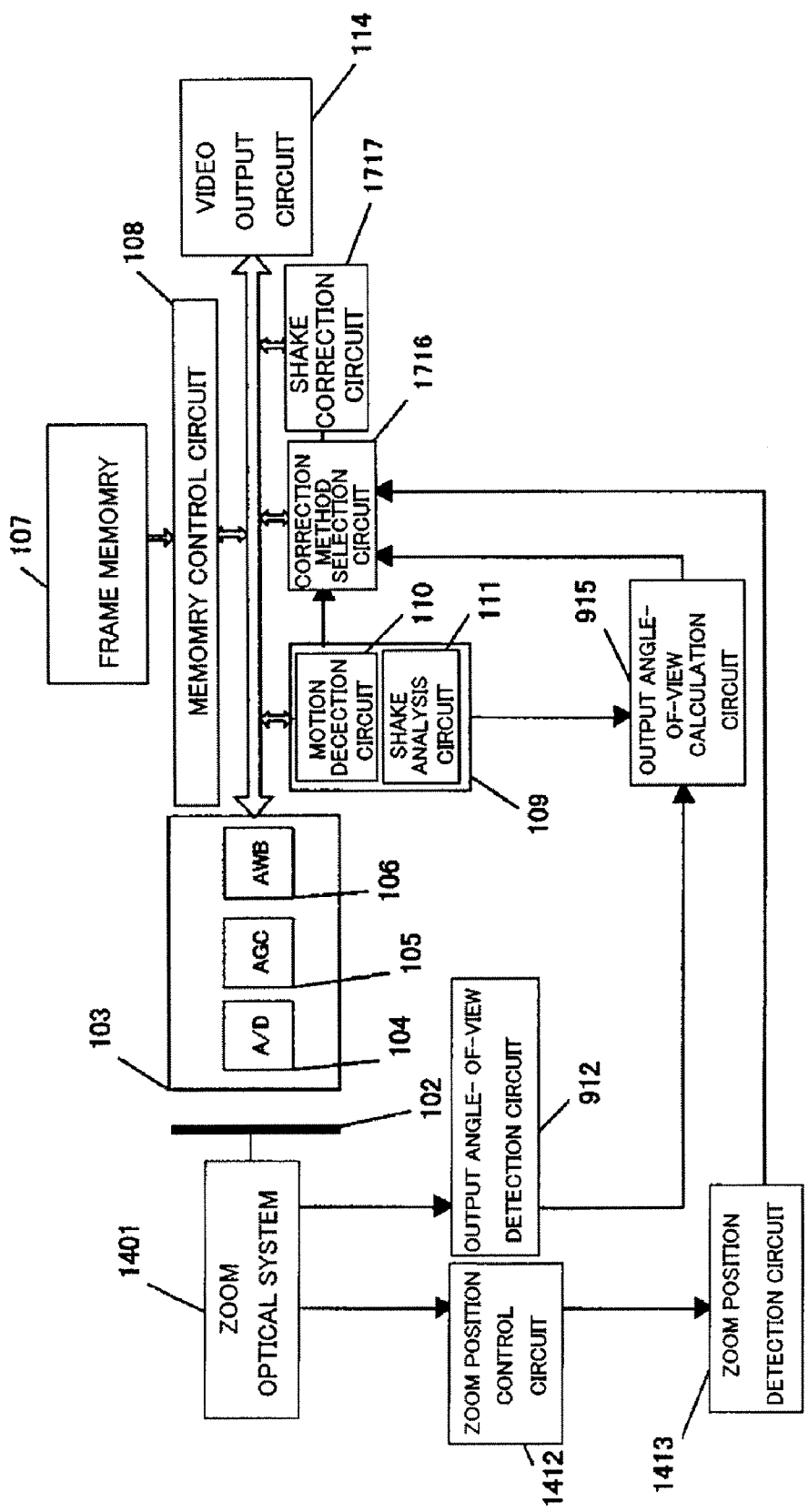
FIG. 17 shows the configuration of an image-pickup apparatus as the fourth embodiment of the invention.

FIG. 17 shows the configuration of an image-pickup apparatus that includes an image processing apparatus as the fourth embodiment of the present invention. This embodiment selects an optimal shake correction method based on the amount of shake on an image, the zoom position of the zoom optical system, and the angle of view of an output image (as well as that of an input image (an input angle of view)).

In FIG. 17, components common to those shown in FIG. 1 are denoted with the same reference numerals as in FIG. 1. The image-pickup apparatus of the embodiment has the input angle-of-view detection circuit 912 and the output angle-of-view calculation circuit 913 which have been described in the second embodiment, in addition to the configuration shown in FIG. 1. The image-pickup apparatus of the embodiment further has the zoom position control circuit 1412 and the zoom position detection circuit 1413 which have been described in the third embodiment.

The operation of the image-pickup apparatus (or image processing apparatus) of the embodiment will be described below with the flowchart shown in FIG. 18.

Steps S1801 and S1802 are similar to steps S201 and S202 shown in the first embodiment (FIG. 2), respectively.

At step S1803, the zoom position control circuit 1412 controls the zoom position of the zoom optical system 1401 in accordance with operation of a zoom switch, not shown, by a user. Also, the zoom position detection circuit 1413 detects the zoom position. Detected zoom position information is sent to the correction method selection circuit 1716.

At step S1804, the output angle-of-view calculation circuit 913 calculates in advance an output angle of view for sending a shake-corrected image to the video output circuit 114. The output angle of view is calculated using an input angle of view detected by the input angle-of-view detection circuit 912 and the amount of shake calculated by the shake analysis part 109. The input angle of view is calculated based on position information for a variable magnification lens unit constituting a part of the zoom optical system 1401 and focal length information of the zoom optical system 1401. The calculated output angle of view is sent to the correction method selection circuit 1716 and the shake correction circuit 1717.

At step S1805, shake occurring in the image which is currently being taken is analyzed using the amount of shake provided by the shake analysis part 109, the zoom position provided by the zoom position detection circuit 1413, and the output angle of view provided by the output angle-of-view calculation circuit 915. Then, a shake correction method most appropriate for correcting the shake is selected.

Here, description will be given of how to select a shake correction method in this embodiment. The shake correction in this embodiment is performed by analyzing characteristics of shake that appears on an image and then selecting a method best suited for correcting the shake from among plural shake correction methods having different degrees of freedom so as to apply shake correction processing.

Also, shake as called in this embodiment refers to shake of the image-pickup apparatus itself appearing as image motion on a taken image.

This embodiment analyzes shake using values such as the amount of shake on an image, the zoom position, and the size of the output angle of view to estimate condition of shake of the image-pickup apparatus itself. And, based on information contained in it such as the type and the magnitude of shake and availability of approximation, this embodiment selects a shake correction method having the most appropriate degree of freedom.

The relation among the amount of shake, the output angle of view, and the shake correction method to be selected in this embodiment is similar to the one described in the second embodiment (FIG. 13). The relation among the amount of shake, the zoom position and the shake correction method to be selected is similar to the one described in the third embodiment (FIG. 16).

Figure 19:
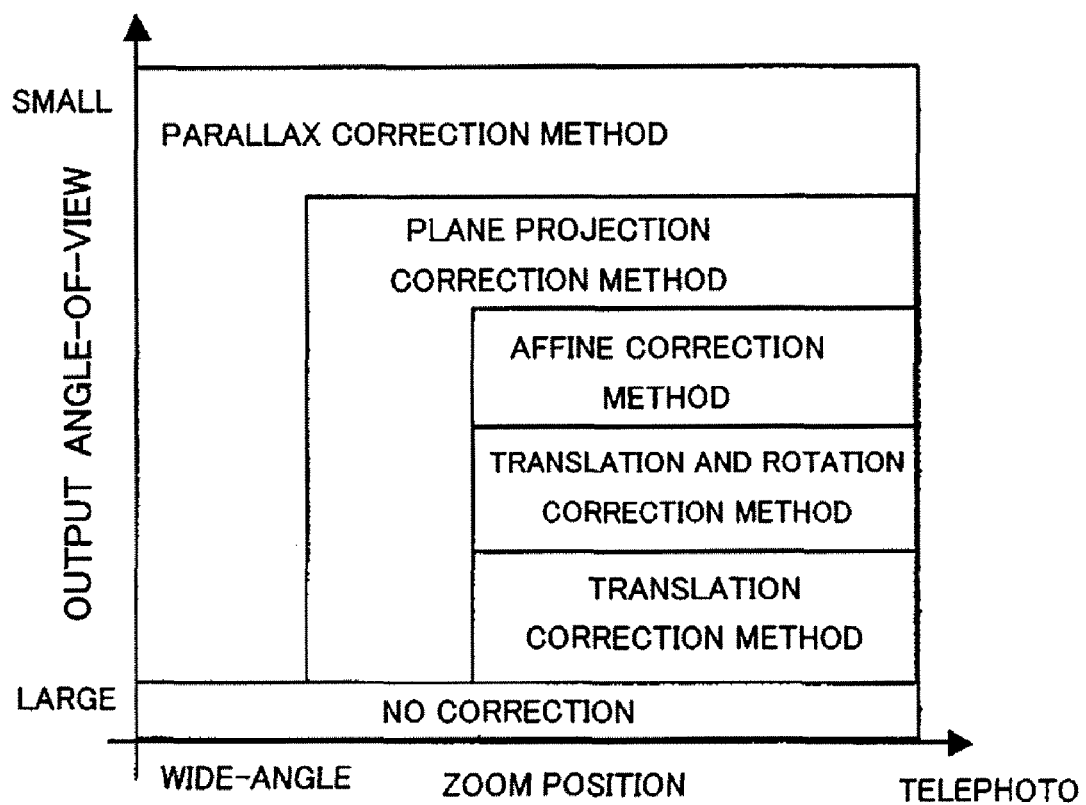
FIG. 19 illustrates relation among zoom position, output angle of view, and shake correction methods.

FIG. 19 illustrates the relation among the size of the output angle of view, the zoom position and the shake correction method that should be selected. In the figure, when the output angle of view is large, the range in which correction is possible in an input image is small, so that correction is applied to small shake only. Consequently, it is possible to select a correction method of low degree of freedom, such as translation correction, and translation and rotation correction methods.

In contrast, when the output angle of view is small, the range in which correction is possible in an input image is large and thus shake to be corrected is larger and more complicated. Thus, it is necessary to select a shake correction method of higher degree of freedom, such as affine correction, plane projection correction, and further parallax correction methods.

When the zoom position is telephoto side, small shake of the image-pickup apparatus itself appears being enlarged as shake on an image, so that a correction method may be selected according to the size of the output angle of view as described above. However, when the zoom position is wide-angle side, actual shake of the image-pickup apparatus itself becomes large, so that it is necessary to select a shake correction method of high degree of freedom as appropriate as illustrated in FIG. 19.

In this manner, a shake correction method that has the most appropriate degree of freedom for correcting shake occurring on an image is selected based on the relation among the amount of shake, the zoom position, and the output angle of view.

Figure 18:
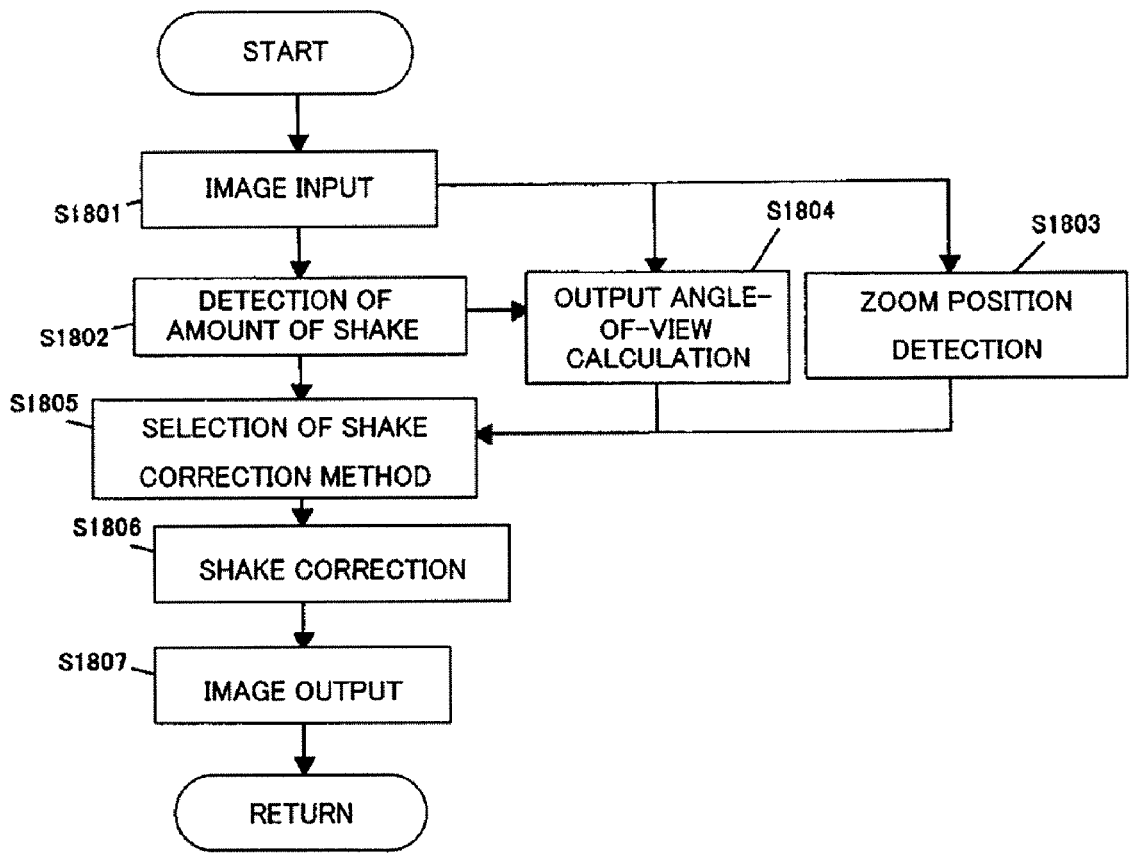
FIG. 18 is a flowchart illustrating shake correction processing in the fourth embodiment.

In FIG. 18, at step S1806, the shake correction circuit 1717 applies shake correction processing using the shake correction method selected at step S1805. Shake correction processing is performed in a similar way to steps S1005 and S1505 in the second and third embodiments described above.

At step S1807, a shake-corrected image is output from the video output circuit 114.

As has been described above, this embodiment selects an optimal shake correction method by utilizing the fact that characteristics of a motion vector that represents shake appearing on an image vary with the amount of shake, the zoom position, and size of the output angle of view. This can realize electronic image stabilization that can perform proper shake correction despite change in shake characteristics of an image-pickup apparatus.

As has been described, according to the embodiments described above, it is possible to select a coordinate transformation method for use in coordinate transformation processing (image processing) which is performed as shake correction processing optimally in various image-taking conditions, that is, conditions of shake occurrence. Thus, it is possible to realize electronic image stabilization function that can provide a good output image (i.e., a shake-corrected image) irrespective of image-taking conditions.

While each of the above embodiments described a case where the correction method selection circuit selects a shake correction method to be applied based on information such as the amount of shake, the present invention is not limited thereto. For example, a user may be allowed to arbitrarily select a shake correction method which the user considers to be best suited for a image-taking condition by operating an operation member, e.g., a switch.

Figure 20:
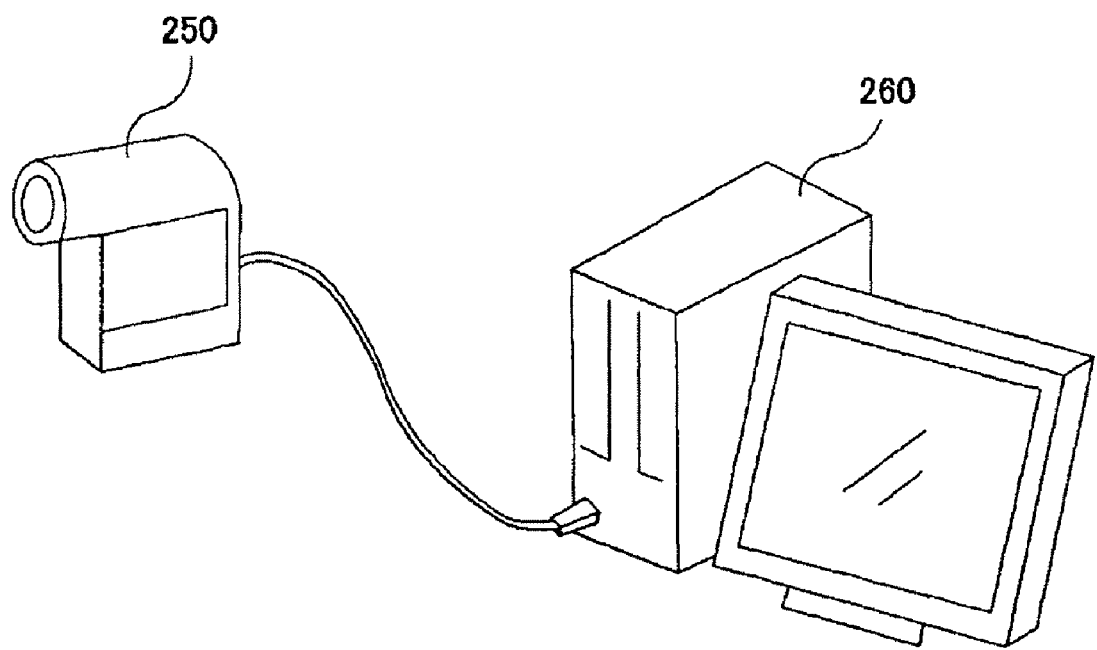
FIG. 20 generally shows a modification of an embodiment of the invention.

In addition, while each of the above embodiments described a case where the image-pickup apparatus contains an image processing apparatus that has shake correction function, the present invention is not limited thereto. For example, as illustrated in FIG. 20, an image taken by the image-pickup apparatus 250 (an input image) may be transmitted to a personal computer 260. The transmission may be made by cable or wirelessly, or via the Internet or a LAN. Then, selection of a shake correction method and shake correction processing, which are illustrated in the flowcharts of FIGS. 2, 10, 15, and 18, can be performed on the personal computer 260. In this case, the personal computer 260 functions as the image processing apparatus of the invention.

Further, in this case, the amount of shake (i.e., motion vectors) may be detected by the personal computer 260 or an output from a shake sensor contained in the image-pickup apparatus may be supplied to the personal computer 260.

Furthermore, the present invention is not limited to these preferred embodiments and various variations and modifications may be made without departing from the scope of the present invention.

This application claims foreign priority benefits based on Japanese Patent Application No. 2005-360108, filed on Dec. 14, 2005, which is hereby incorporated by reference herein in its entirety as if fully set forth herein.

What is claimed is:

1. An image processing apparatus, comprising:
    a shake correcting part configured to perform coordinate transformation processing, based on shake information, to an input image generated with an image-pickup device;
    an output area determining part configured to determine an output image area within the input image based on angle of view information of the input image and the shake information; and
    a method changing part configured to change a coordinate transformation method for the coordinate transformation processing based on the shake information and information on the determined output image area.

2. The image processing apparatus according to claim 1, wherein the method changing part is configured to change the coordinate transformation method further based on both the shake information and zoom information for a zoom optical system that forms an image of a subject on the image-pickup device.

3. The image processing apparatus according to claim 1, further comprising a shake information generating part configured to generate the shake information from the input image.

4. The image processing apparatus according to claim 1, wherein the method changing part changes the coordinate transformation method for each of areas that have different distances in the input image.

5. The image processing apparatus according to claim 1, wherein the method changing part changes the coordinate transformation method between at least two among a translation transformation method, a translation and rotation transformation method, an affine transformation method, and a plane projection transformation method.

6. An image-pickup apparatus comprising:
    an image-pickup device configured to generate an input image; and
    an image processing apparatus comprising:
    a shake correcting part configured to perform coordinate transformation processing, based on shake information, to the input image generated with the image-pickup device;
    an output area determining part configured to determine an output image area within the input image based on angle of view information of the input image and the shake information; and
    a method changing part configured to change a coordinate transformation method for the coordinate transformation processing based on the shake information and information on the determined output image area.

7. A shake correcting method comprising the steps of:
    obtaining shake information;
    performing coordinate transformation processing, based on the shake information, to an input image generated with an image-pickup device;
    determining an output image area within the input image based on angle of view information of the input image and the shake information; and
    changing a coordinate transformation method for the coordinate transformation processing based on the shake information and information on the determined output image area.

8. A non-transitory memory medium that stores program instructions executable by a processor to perform the shake correcting method according to claim 7.

* * * * *